# (12) United States Patent
Eyer

(10) Patent No.: US 7,746,870 B2
(45) Date of Patent: Jun. 29, 2010

(54) EFFICIENT TRANSPORT OF PROGRAM CLOCK REFERENCE FOR AUDIO SERVICES DELIVERED ON AN MPEG-2 TRANSPORT STREAM

(76) Inventor: Mark Kenneth Eyer, 12918 NE. 122$^{nd}$ La., #K-302, Kirkland, WA (US) 98034

( * ) Notice: Subject to any disclaimer, the term of this patent is extended or adjusted under 35 U.S.C. 154(b) by 2126 days.

(21) Appl. No.: 10/080,729

(22) Filed: Feb. 22, 2002

(65) Prior Publication Data

US 2002/0118679 A1    Aug. 29, 2002

Related U.S. Application Data

(60) Provisional application No. 60/271,824, filed on Feb. 27, 2001.

(51) Int. Cl.
*H04L 12/28* (2006.01)
(52) U.S. Cl. .................................. 370/395.63; 370/535
(58) Field of Classification Search ................. 370/535, 370/516, 395.64; 715/203
See application file for complete search history.

(56) References Cited

U.S. PATENT DOCUMENTS

| 5,598,352 A * | 1/1997 | Rosenau et al. ............. 715/203 |
| 5,805,602 A * | 9/1998 | Cloutier et al. ............. 370/516 |
| 6,185,228 B1 * | 2/2001 | Takashimizu et al. ........ 370/535 |
| 2005/0201390 A1 * | 9/2005 | Kikuchi .................. 370/395.64 |

* cited by examiner

*Primary Examiner*—Albert T Chou
(74) *Attorney, Agent, or Firm*—Blakely, Sokoloff, Taylor & Zafman LLP

(57) ABSTRACT

A system and corresponding methods efficiently transport Program Clock Reference (PCR) for audio services delivered on an MPEG-2 Transport Stream (TS) to an audio subsystem. The system processes an original Transport Stream (TS) to remove video packets other than those carrying the Program Clock Reference (PCR) and delivers the packets carrying the Program Clock Reference (PCR) along with audio to a receiving device. The total bandwidth needed to deliver the audio plus the necessary system clock and presentation timing information is therefore reduced.

25 Claims, 6 Drawing Sheets

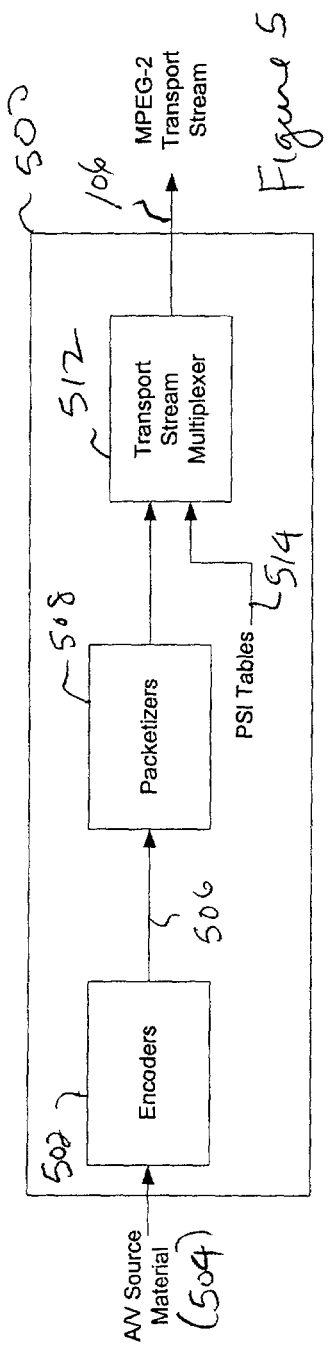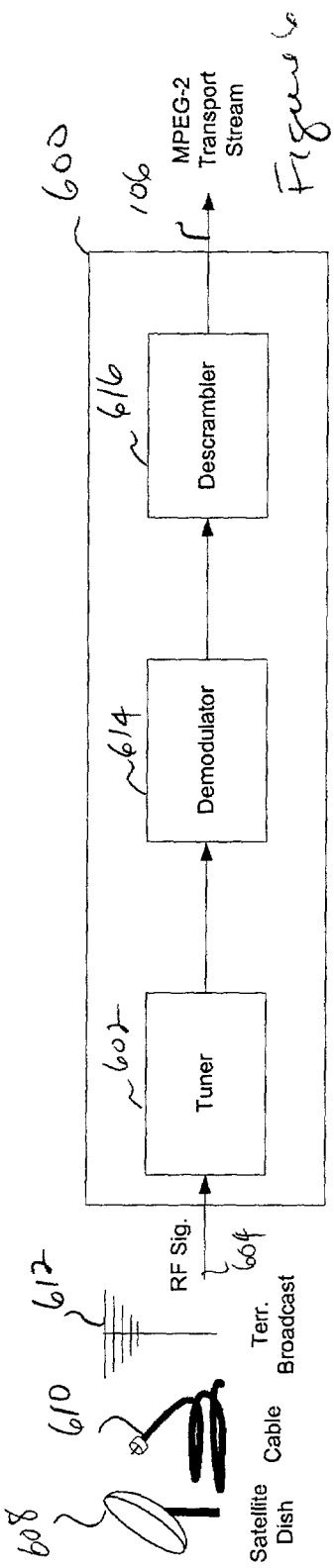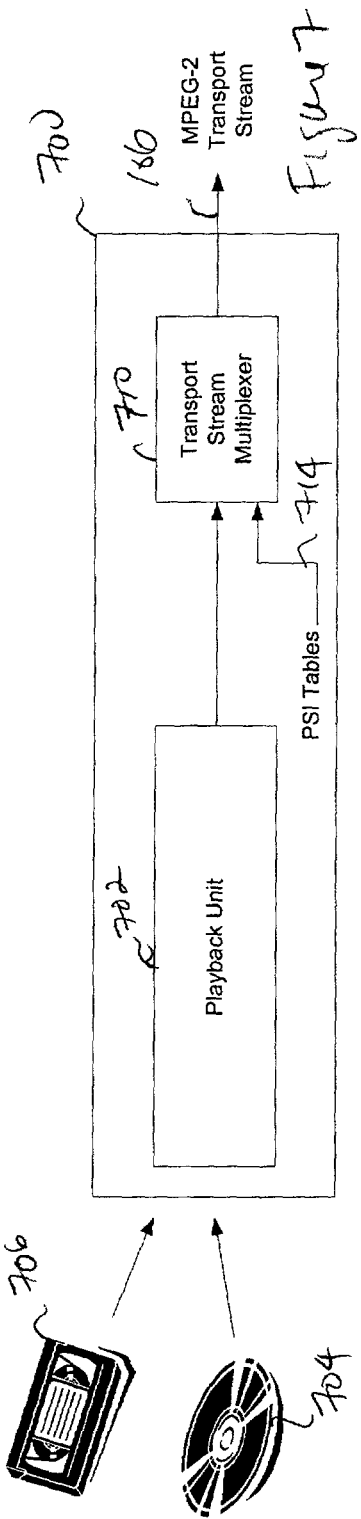

EFFICIENT TRANSPORT OF PROGRAM CLOCK REFERENCE FOR AUDIO SERVICES DELIVERED ON AN MPEG-2 TRANSPORT STREAM

CROSS-REFERENCE TO RELATED APPLICATIONS

The present application claims priority to provisional application Ser. No. 60/271,824 filed Feb. 27, 2001 titled "Efficient Transport of Program Clock Reference for Audio Services Delivered on an MPEG-2 Transport Stream", with inventor Mark Kenneth Eyer.

FIELD OF THE INVENTION

The present invention is related to transmitting and receiving digital video and audio and, in particular, to transmitting and receiving digital video and audio using MPEG-2 (ISO/IEC 13818-1).

BACKGROUND INFORMATION

Source material (or a program), such as movies, sports, news, and music typically includes video, audio, and other associated data, which are commonly formatted for storage and transmission according to MPEG-2 Systems Standard ISO/IEC 13818-1 2000, titled "Information Technology—Generic Coding of Moving Pictures and Associated Audio—Part 1: Systems," pp. 9-21 into a video elementary stream (video ES) and one or more audio elementary streams (audio ES). The video ES and the audio ES are packetized into a video packetized elementary stream (video PES) and one or more audio packetized elementary streams (audio PES). The video PES, audio PES, and associated data are multiplexed into a Transport Stream (TS), which may be delivered to a receiving device, such as a television set or a set top box, via cable, satellite, Digital Versatile Disc (DVD) Player, and/or terrestrial broadcast. PES packets that form a program share a common time base.

Each MPEG-2 Transport Stream (TS) may carry several programs, each of which is made up of one or more program elements. Each program element is packetized for delivery into Transport Stream packets. Each Transport Stream packet is a 188-byte structure made up of a four-byte header and a payload of up to 184 bytes. The TS packet header includes a thirteen-bit Packet Identifier (PID), which is a unique integer value associated with each program element. All packets in a particular program element have the same PID value. Packets in another program element have a unique value of PID.

The identities of the video and audio elementary streams (ES) are defined by descriptive information called Program Specific Information (PSI) included in the Transport Stream (TS). Program Specific Information (PSI) tables contain information needed by receiving devices to demultiplex and present programs. The Program Specific Information (PSI) includes a Program Association Table (PAT) and a Program Map Table (PMT). The PAT provides the association between a program number and the Packet Identifier (PID) value of the Transport Stream (TS) packets carrying a Program Map Table for that program. The Program Map Table (PMT) provides the mappings between program numbers and the program elements that make up the program. The Program Map Table (PMT) lists the elementary stream (ES) components, the "stream type" of each component (e.g., audio stream, video stream, data stream, etc.), and the Packet Identifier (PID) value associated with each elementary stream (ES).

The receiving device receives the Transport Stream (TS), delivers the video portion of the program to a video subsystem such as a display (e.g., television screen), and delivers the audio portion to an audio subsystem such as a decoder/amplifier, a powered loudspeaker, or headphones. Sometimes the receiving device may deliver the audio portion of the program via one or more network interfaces the physical link to the audio subsystem of which is bandwidth limited. In this case, audio may have to be sent in compressed format. Delivery of compressed audio requires time-based alignment (or synchronization) of the (decoded) audio with the associated video (i.e., lip-synch).

One known way to accomplish lip-synch is to include presentation timing information called a presentation time stamp (PTS) in each presentation unit (e.g., per video frame, per audio frame), which indicates the time of presentation of a particular frame with respect to a system clock time base. In essence, the program is a collection of program elements with a common time base.

Frames of decoded video or audio are delivered to the audio/video outputs when the time value of the system clock matches the PTS value. The system clock in MPEG-2 is based on a twenty-seven megahertz (MHz) oscillator that is synchronized on the receiving end by means of Program Clock Reference (PCR) samples. The receiving device uses the values of the PCR samples to adjust its twenty-seven MHz oscillator up or down as necessary to achieve lock with the like oscillator in the source device. In this and other known ways to accomplish lip-synch, the full Transport Stream (TS) is delivered to the receiving device and the receiving device then decodes and delivers the audio portion of the program to one or more audio subsystems. Still other known ways of accomplishing lip-synch involve delivery of audio packets and video packets corresponding to the Program Clock Reference Packet Identifier (PCR PID).

Typically, the video elementary stream (ES) carries the Program Clock Reference (PCR) samples. Timing information in PCR fields needed for lip-synch is coded as the sampled value of a program's system clock. This can be problematical because one or more packets in the video PES commonly include the PCR and the bit rate of the video is too fast to be properly conveyed by the physical layer transport methods used by certain wireless communication systems in use today. For example, the video bit rate (e.g., commonly ranging from two to twenty megabits per second (Mbps)) far exceeds the capacity of well-known wireless technologies such as Bluetooth and the Institute of Electrical and Electronics Engineers (IEEE) 802.11b Standard "Wireless LAN Media Access Control (MAC) Physical Layer Specifications: High-Speed Physical Layer Extension in the 2.4 GHz Band." As a result, such technologies may be unusable in high-speed applications.

SUMMARY OF THE INVENTION

A system and corresponding methods efficiently transport Program Clock Reference (PCR) for audio services delivered on an MPEG-2 Transport Stream (TS) to an audio subsystem. The system processes an original Transport Stream (TS) to remove video packets other than those carrying the Program Clock Reference (PCR) and delivers the packets carrying the Program Clock Reference (PCR) along with audio to a receiving device. The total bandwidth needed to deliver the audio plus the necessary presentation timing information is therefore reduced, and the work and complexity involved in re-processing the original Transport Stream for delivery across the bandwidth-limited transmission path is reduced.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 5 is an example computer system suitable for implementing embodiments of the present invention.

FIG. 6 is a first example of a high-level block diagram of circuitry suitable for generating a transport stream.

FIG. 7 is a second example of a high-level block diagram of circuitry suitable for generating a transport stream.

DETAILED DESCRIPTION OF THE ILLUSTRATED EMBODIMENTS

Figure 1:
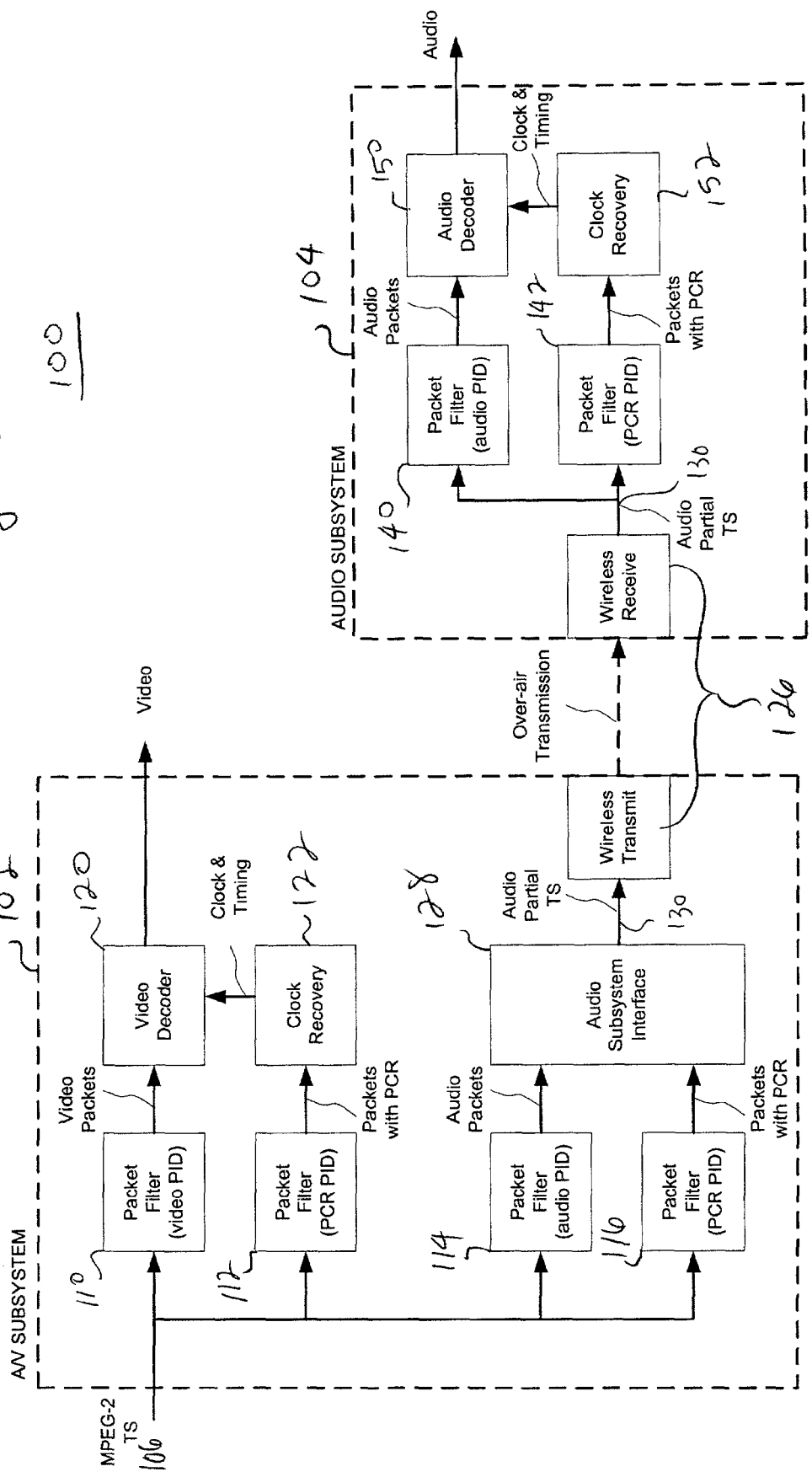
FIG. 1 is a high-level block diagram of a multimedia system according to embodiments of the present invention.

Embodiments of the present invention are directed to efficient transport of the Program Clock Reference (PCR) for audio services delivered on an audio/video (A/V) stream Transport Stream (TS). For purposes of discussion herein, embodiments of the present invention may be described in terms of the MPEG-2 standard. However, the present invention may be applicable to other types of A/V streams. One embodiment processes an original Transport Stream (TS) to produce an audio partial Transport Stream and a video partial Transport Stream. The audio partial Transport Stream includes video packets carrying the Program Clock Reference (PCR) and packets carrying audio data. The video partial Transport Stream includes video. The audio partial Transport Stream may be delivered to a bandwidth-limited device at relatively slow data rates because the total bandwidth needed to deliver the audio along with presentation timing information (PCR) is thus reduced.

To illustrate, the MPEG-2 standard states that a Program Clock Reference (PCR) must be included in the Transport Stream (TS) at least once each one hundred milliseconds. If Program Clock Reference (PCR) values appear in the multiplex of Transport Streams (TS) at a rate of ten per second, there will be 1,880 bytes per second or 15,050 bits per second (approximately 15 kbps) devoted to Program Clock Reference (PCR) data, which is a lower data rate as compared to anywhere from two to twenty (or more) Mbps when full video (e.g., all packets matching the Program Clock Reference Packet Identifier (PCR PID) is carried to an audio subsystem.

In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring embodiments of various embodiments of the invention.

Some parts of the description will be presented using terms such as elementary stream, Transport Stream, MPEG, lip-synch, and so forth. These terms are commonly employed by those skilled in the art to convey the substance of their work to others skilled in the art.

Various operations will be described as multiple discrete blocks performed in turn in a manner that is most helpful in understanding the invention. However, the order in which they are described should not be construed to imply that these operations are necessarily order-dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a high-level block diagram of a multimedia system 100 according to embodiments of the present invention. The multimedia system 100 processes (e.g., encodes, multiplexes, compresses, synchronizes, decodes, decompresses) moving pictures and associated audio for transmission and reception according to MPEG-2 transport standards. The multimedia system 100 may be all or part of a satellite system (e.g., a Direct Broadcast Satellite (DBS)), a cable system (e.g., community antenna or access television (CATV), a terrestrial broadcast, a digital television (DTV) system (e.g., high definition digital television (HDTV) or standard definition digital television (SDTV)), a digital versatile disc or digital video disc (DVD) system, a video cassette recorder (VCR) or player, an electronic game system, or other suitable system that delivers digital audio and video using an MPEG-2 Transport Stream (TS).

The multimedia system 100 includes an audio/video (A/V) subsystem 102 and an audio subsystem 104. The audio subsystem 104 may interface to or be part of an amplifier, receiver, powered loudspeaker, or headphones. The multimedia system 100 may interface to or be part of a video subsystem (not shown), which may include a television screen, a movie screen, or a computer screen.

The audio/video (A/V) subsystem 102 and/or audio subsystem 104 may receive a Transport Stream (TS) 106 from any one of a variety of origins, as is described with reference to FIG. 5 below. The Transport Stream (TS) 106 is delivered to several packet filters 110, 112, 114, and 116. The packet filters 110, 112, 114, and 116 may be may be circuitry, firmware, and/or software to filter the Transport Stream (TS) 106 as described herein.

For example, the packet filter 110 filters out all packets from the Transport Stream 106 except those that include video Packet Identifiers (video PID). The packet filter 110 then delivers the packets to a video decoder 120, which decodes the packets according to MPEG-2 standards. The video decoder 120 then delivers the decoded packets to the video subsystem (not shown), via a high-speed link (not shown) such a well-known Fire Wire link, IEEE 1394 Isochronous Channels link, well-known iLink, or other high-speed link.

The packet filter 112 filters out all packets from the Transport Stream 106 except those that include the Program Clock Reference Packet Identifier (PCR PID). The packet filter 112 then delivers the packets with the Program Clock Reference to clock recovery circuitry 122, which recovers the presentation timing information according to MPEG-2 standards. The clock recovery circuitry 122 delivers the system clock and presentation timing to the video decoder. Some of the packets passed by the packet filter 112 may be audio packets The packet filter 114 filters out all packets from the Transport Stream 106 except those that include audio Packet Identifiers (audio PID). The audio packets are then delivered to an audio subsystem interface 128, which interfaces the destination audio/video (A/V) subsystem 102 with the audio subsystem 104.

The example packet filter 116 filters out all packets from the Transport Stream 106 except those that include the Program Clock Reference Packet Identifier (PCR PID). The packet filter 116 then delivers the packets with the Program Clock Reference to the audio subsystem interface 128.

The audio subsystem interface 128 generates an Audio Partial Transport Stream (TS) 130 from the audio packets and the packets that have the Program Clock Reference, and delivers the Audio Partial Transport Stream (TS) 130 to the audio subsystem 104 via a link 126. In one embodiment of the present invention, the audio subsystem interface 128 and/or the link 126 are bandwidth-limited.

For example, the audio subsystem interface 128 and link 126 may implement Bluetooth, HomePNA, or IEEE 802.11b technologies. Of course, embodiments of the present invention are not limited to the type of interface and link used to implement the audio subsystem interface 128 and link 126. Moreover, although depicted as a wireless link, the link 126 may not be a wireless link. After reading the description herein, persons of ordinary skill in the relevant art(s) will readily recognize how to implement embodiments of the packet filters 110, 112, 114, 116, and/or other suitable packet filters.

The destination audio subsystem 104 receives the Audio Partial Transport Stream (TS) 130 and delivers the Audio Partial Transport Stream (TS) 130 to two packet filters 140 and 142. The packet filters 140 and 142 may be may be circuitry, firmware, and/or software to filter the Audio Partial Transport Stream (TS) 130 as described herein.

For example, the packet filter 140 filters out all packets from the Audio Partial Transport Stream (TS) 130 except those that include audio Packet Identifiers (audio PID). The audio packets are then delivered to an audio decoder 150, which decodes the audio packets according to MPEG-2 standards. Circuitry, firmware, and/or software suitable for implementing the audio decoder 150 are well known. The audio decoder 150 delivers the audio to such audio components as an amplifier, a receiver, powered loudspeaker, or headphones.

The packet filter 142 filters out all packets from the Audio Partial Transport Stream 130 except those that include the Program Clock Reference Packet Identifier (PCR PID). The packet filter 142 then delivers the packets with the Program Clock Reference to clock recovery circuitry 152, which recovers the presentation timing information according to MPEG-2 standards. The clock recovery circuitry 152 delivers the system clock and presentation timing to the audio decoder 140.

Figure 2:
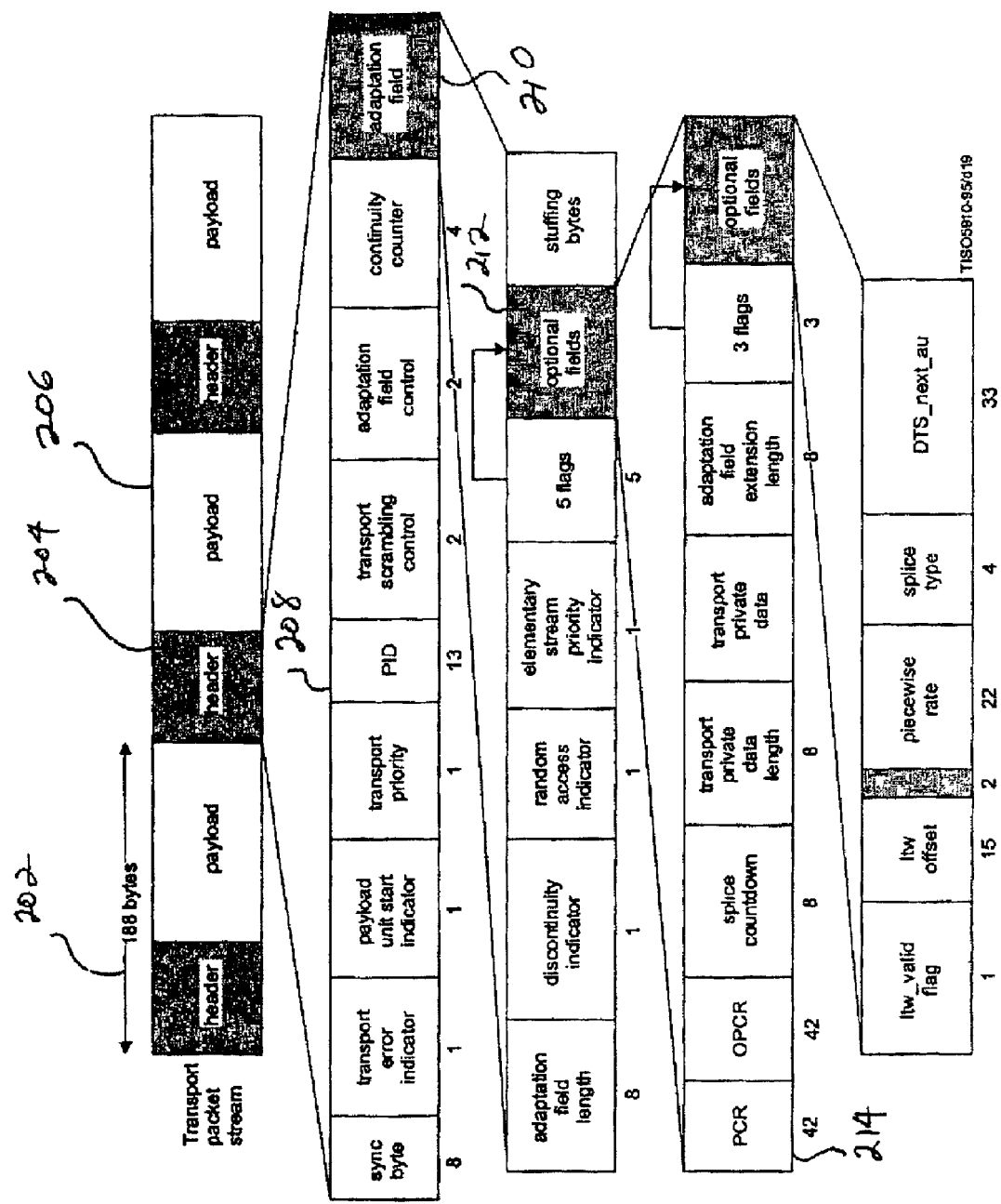
FIG. 2 is an exemplary diagram of an MPEG-2 Transport Stream (TS)

FIG. 2 is a diagram of the MPEG-2 Transport Stream (TS) 106, which includes a series of transport packets 202, each of which includes a header 204 and a payload 206. Each header 204 includes, among other things, a Packet Identifier (PID) 208, and an Adaptation Field 210. The Adaptation Field 210 is utilized when the header 204 is larger than normal, as is well known. In the illustrated Transport Stream (TS) 106, the Adaptation Field 210 includes optional fields 212, which include a Program Clock Reference (PCR) 214. Recall from above that the Transport Stream (TS) 106 also includes Program Specific Information (PSI) such as Program Association Table (PAT) and the Program Map Table (PMT) multiplexed with the packetized elementary streams (PES).

Figure 3:
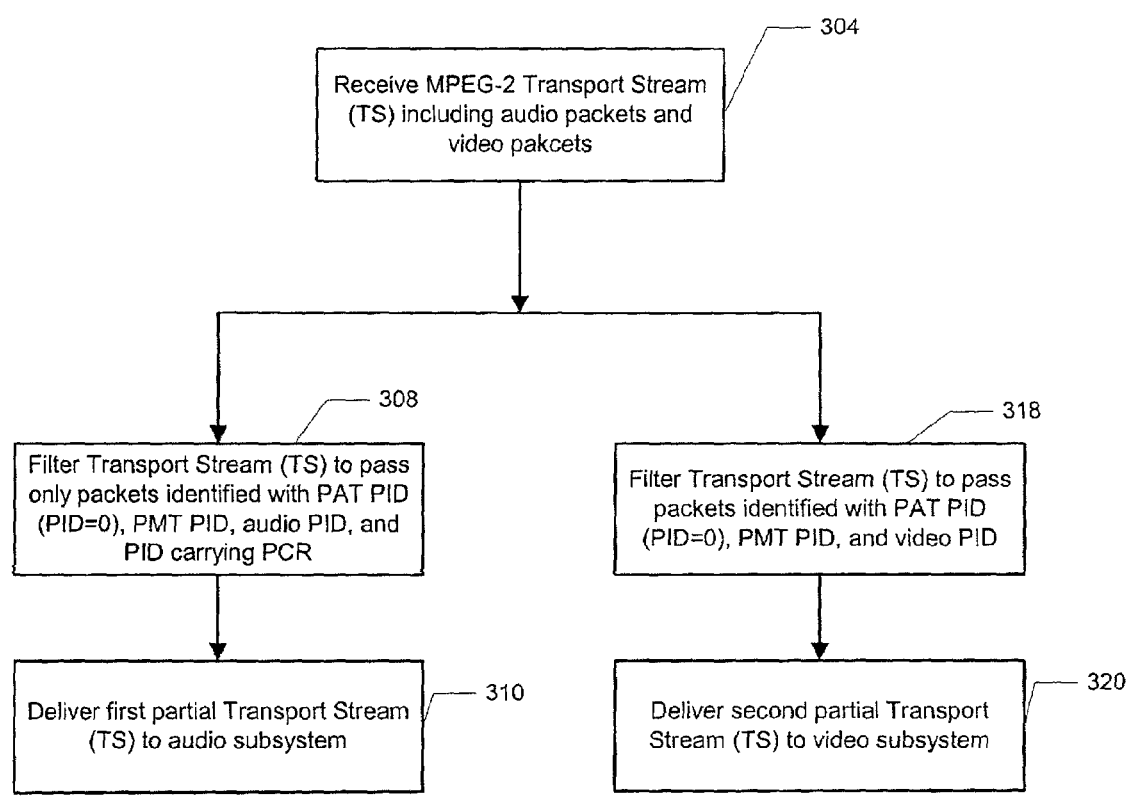
FIG. 3 is a flowchart illustrating a process performed by a destination audio/video subsystem according to embodiments of the present invention.

FIG. 3 is a flowchart illustrating a process 300 performed by the multimedia system 100 according to embodiments of the present invention. A machine-readable medium with machine-readable instructions thereon may be used to cause a processor to perform the process 300.

In the illustrated process 300, a block 304 receives a Transport Stream (TS) and passes the Transport Stream (TS) to a block 308 and a block 318. The Transport Stream (TS) includes video packets and audio packets.

The block 308 filters a Transport Stream (TS) to create a first partial Transport Stream. In one embodiment, the block 308 passes only TS packets identified with the Program Association Table (PAT) Packet Identifier (PAT PID (PID=0)), TS packets identified with the Program Map Table Packet Identifier (PMT PID), TS packets identified with audio Packet Identifiers (audio), and TS packets identified with the Program Clock Reference PID that actually include PCR samples in their adaptation fields (other TS packets identified with the PCR PID are not passed). The first partial Transport Stream thus includes Program Specific Information, audio packets, the system clock reference, and timing for audio presentation (i.e., an Audio Partial Transport Stream).

A block 310 delivers the first partial Transport Stream to an audio subsystem. In one embodiment, the first partial Transport Stream may be delivered to an audio amplifier driving rear channels of a surround sound system, for example. The data rate of the first partial Transport Stream may be on the order of five hundred kilobits per second (500 kbps).

The block 318 filters the Transport Stream to create a second partial Transport Stream. In one embodiment, the block 318 passes TS packets identified with the Program Association Table (PAT) Packet Identifier (PAT PID (PID=0)), TS packets identified with the Program Map Table Packet Identifier (PMT PID), and TS packets identified with video Packet Identifiers (video). The second partial Transport Stream thus includes Program Specific Information, video packets, the system clock reference, and video presentation timing (i.e., a Video Partial Transport Stream).

A block 320 delivers the second partial Transport Stream to a video subsystem. In one embodiment, the second partial Transport Stream may be delivered to front channels of a surround sound system. The data rate of the second partial Transport Stream may be on the order of two to twenty or more megabits per second (2-20 or more Mbps).

Figure 4:
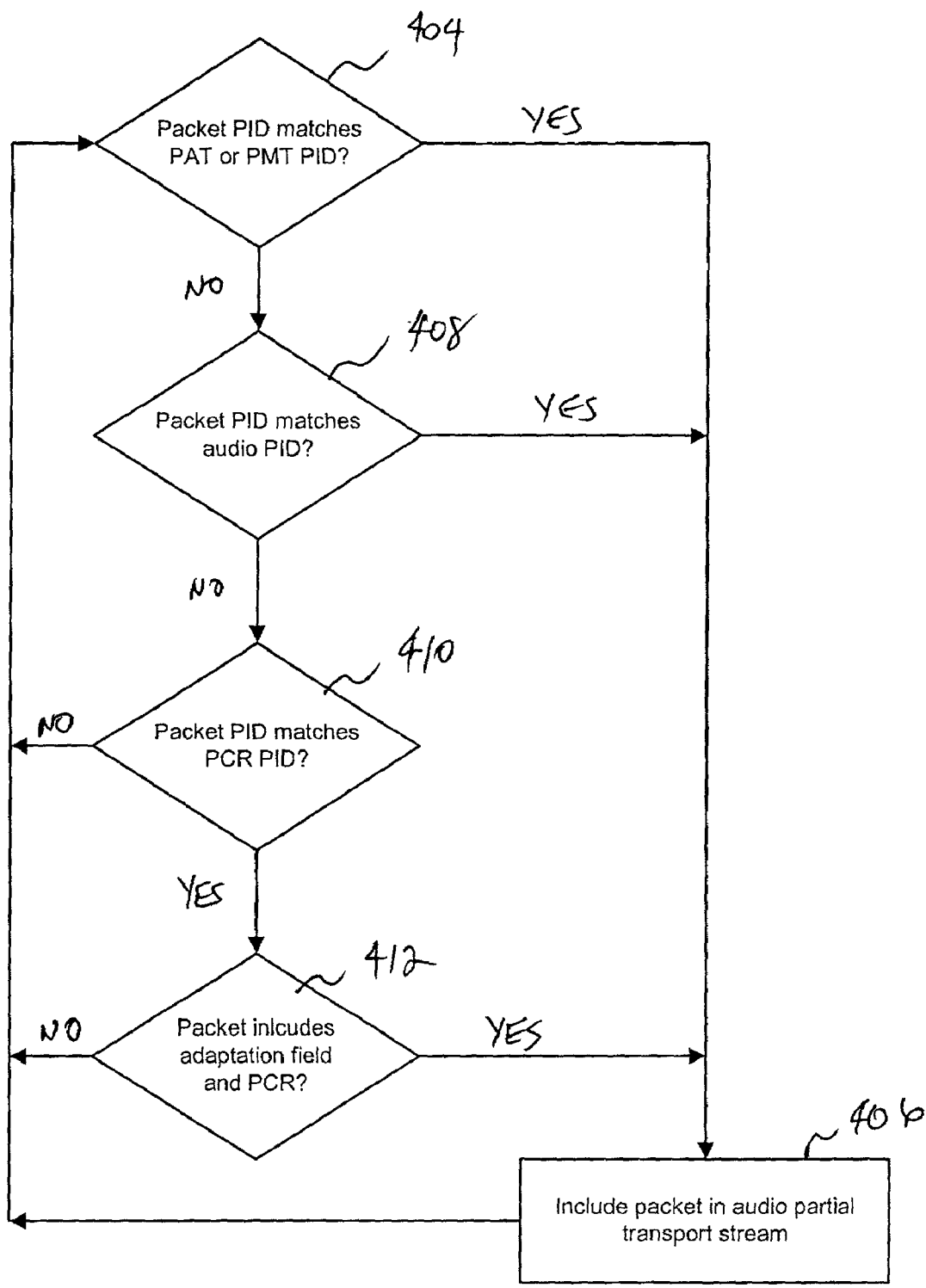
FIG. 4 is a flowchart of a process implemented by a packet filter for generating an audio partial Transport Stream according to embodiments of the present invention.

FIG. 4 is a flowchart of a process 400 for generating an Audio Partial Transport Stream according to embodiments of the present invention. The example process 400 checks the Transport Stream packets one-by-one to determine which packets should be included in the Audio Partial Transport Stream. Only packets actually having a Program Clock Reference (PCR) are included in the Audio Partial Transport Stream, as first segregated according to Program Clock Reference Packet Identifier (PCR PID). Thus, not all TS packets having a PCR PID are included in the Audio Partial Transport Stream. A machine-readable medium with machine-readable instructions thereon may be used to cause a processor to perform the process 400.

A block 404 determines whether a Packet Identifier (PID) for a packet matches the Program Association Table Packet Identifier (PAT PID) or the Program Map Table Packet Identifier (PMT PID). If the PID for the packet matches the PAT PID or PMT PID, the process 400 performs a block 406, which includes the packet in the Audio Partial Transport Stream. If, on the other hand, the PID for the packet does not match the PAT PID or the PMT PID, the process 400 performs a block 408.

The block 408 determines whether the PID for the packet matches an audio Packet Identifier (audio PID). If the PID for the packet matches the audio PID, the process 400 performs the block 406, which includes the packet in the Audio Partial Transport Stream. If, on the other hand, the PID for the packet does not match the audio PID, the process 400 performs a block 410.

The block 410 determines whether the PID for the packet matches a Program Clock Reference Packet Identifier (PCR PID). If the PID for the packet matches the PCR PID, the process 400 performs a block 412. If, on the other hand, the PID for the packet does not match the PCR PID, the process 400 performs the block 404 for the next packet in the Transport Stream.

The block 412 determines whether the packet in which the PID matches the PCR PID includes an Adaptation Field and a PCR sample. If the packet includes an Adaptation Field and a PCR sample, the process 400 performs the block 406, which includes the packet in the Audio Partial Transport Stream. If, on the other hand, the packet does not include an Adaptation Field and a PCR sample, the process 400 performs the block 404 for the next packet in the Transport Stream.

FIG. 5 is a high-level block diagram of circuitry 500 suitable for generating a transport stream . The circuitry 500 includes one or more encoders 502, which receive audio/video (A/V) source material 504 and encode the source material 504 according to MPEG-2 audio/video compression standards. The encoders 502 may be circuitry that encodes audio, data, and video according to MPEG-2 standards and outputs the coded video, coded audio, or other coded bit streams as at least one elementary stream (ES) 506. The source material 504 may be a movie, a television program, a music video, a computer game, or other source material suitable for MPEG-2 encoding.

The elementary stream (ES) 506 is delivered to one or more packetizers 508 (typically an audio packetizer and a video packetizer), which packetizes the elementary stream (ES) 506 into a packetized elementary stream (PES) 51. The packetized elementary stream (PES) 510 is delivered to a Transport Stream (TS) multiplexer 512, which multiplexes individual packetized elementary streams (PES) 510 with each other and with any Program Specific Information (PSI) tables 514 (e.g., the Program Association Tables (PAT) and the Program Map Table (PMT)) to produce the Transport Stream (TS) 106. Circuitry suitable for implementing the circuitry 500 is well known.

FIG. 6 is a high-level block diagram of circuitry 600 suitable for generating a transport stream. The circuitry 600 includes a tuner 602, which receives programming (e.g., movies, sports, news, and music) carried on a radio frequency (RF) signal 604 from a satellite dish 608, a cable 610, or a terrestrial broadcast antenna 612. The tuner 602 cleans the incoming RF signal 604 as needed to enable a demodulator 614 to recover the programming from the RF signal 604. A descrambler 616 descrambles the programming, if it has been scrambled prior to transmission, to produce the Transport Stream 106. Circuitry suitable for implementing the circuitry 600 is well known.

FIG. 7 is a high-level block diagram of circuitry 700 suitable for generating a transport stream. The circuitry 700 includes a playback unit 702, which receives programming (e.g., movies, sports, news, and music) from a video disc 704 or a video cassette 706 recorded according to MPEG-2 standards. The playback unit 702 may be well-known circuitry (e.g., magnetic reader circuitry, optical reader circuitry) capable of delivering audio and video to a Transport Stream multiplexer 710. The Transport Stream (TS) multiplexer 710 multiplexes the output of the playback unit 702 with Program Specific Information (PSI) tables 714 (e.g., the Program Association Tables (PAT) and the Program Map Table (PMT)) to produce the Transport Stream (TS) 106. The circuitry suitable for implementing 700 is well known.

Figure 8:
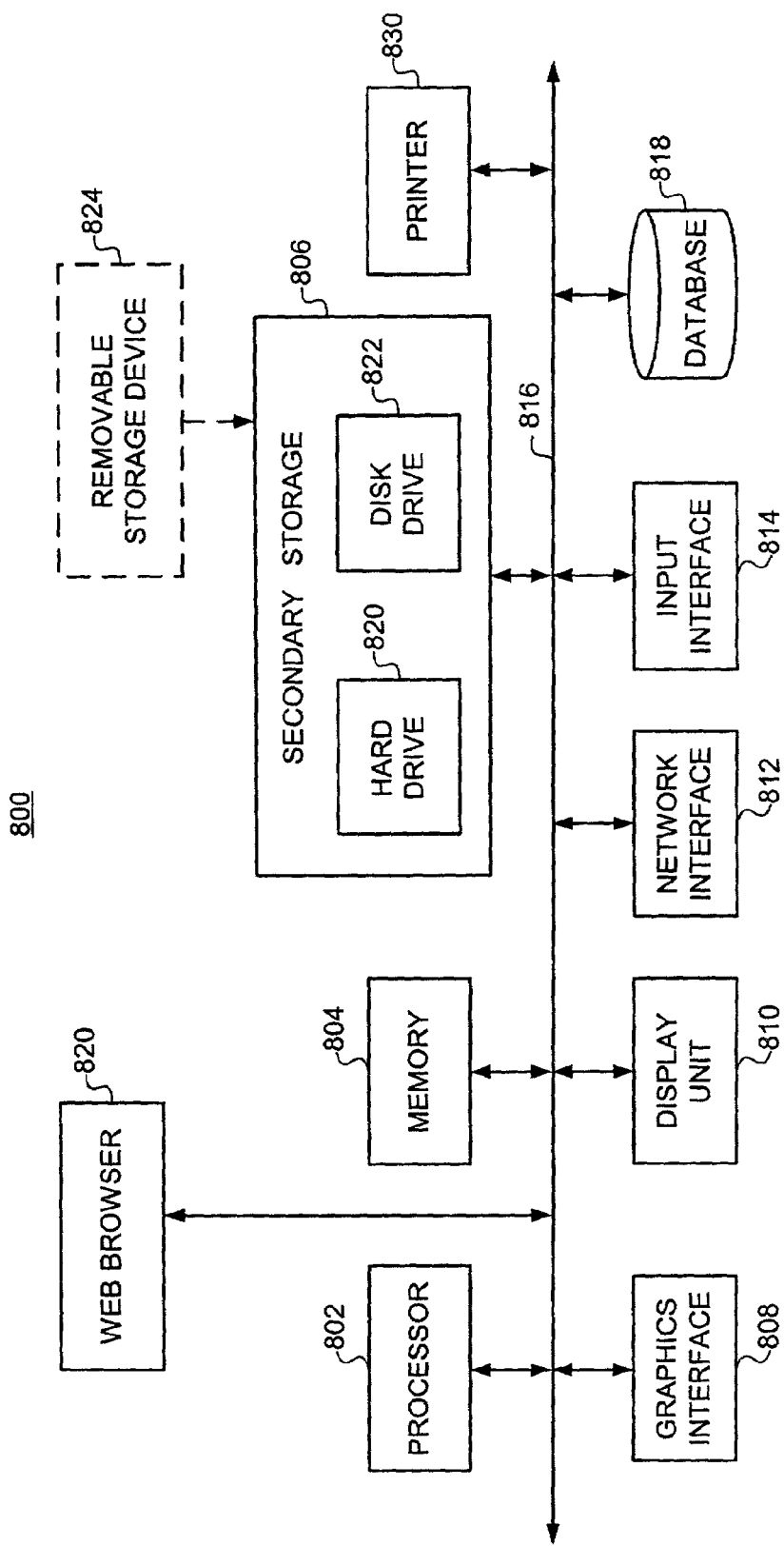
FIG. 8 is an example of a computer system suitable for implementing embodiments of the present invention.

FIG. 8 is an example computer system 800 suitable for implementing embodiments of the present invention. Although the computer system 800 is described with specific components and architecture for illustration, it should be understood that the present invention may be implemented in several other types of embodiments. For example, the invention can be implemented on multiple cooperating networked computer systems. In addition, each component can be implemented as a combination of one or more of hardware, software, and firmware.

The computer system 800 may contain one or more processors, such as a processor 802, a memory 804, a secondary storage 806, a graphics interface 808, a display unit 810, a network interface 812, an input interface 814, a database 816, a web browser 820, and a printer 830. Any or all of the components may communicate with each other over communication path 818, which may contain several buses, as is well known. The source audio/video subsystem 102 and a destination audio/video subsystem 104 may include any or all of the components in the computer system 800.

The processor 802 performs its conventional functions of executing programming instructions including implementing many of the teachings of the present invention. The processor 802 can be a processor of the Pentium® processor family available from Intel Corporation of Santa Clara, California, but might be any suitable processor. The audio subsystem 128 may include a processor 802 and the video subsystem 138 may include a processor 802.

The memory 804 performs its conventional functions of storing data (pixels, frames, audio, video, etc.) and software (control logic, instructions, code, computer programs, etc.) for access by other computer system 800 components. In general, the memory 808 includes several data lines corresponding to several addressable storage locations. Memory technology is well known. In one embodiment, the memory 804 is accessible by the processor 802, and other computer system 800 components to read/write data and/or software (instructions).

The secondary storage 806 may include a machine-readable medium with machine-readable instructions stored thereon, which may be used to cause the processor 802 to perform many of the operations described herein. In one embodiment, the secondary storage 806 is similar to the memory 804 in that it stores data (pixels, frames, audio, video, text, etc.) and software (control logic, instructions, code, computer programs, etc.) for access by other computer system 800 components. The secondary storage 8068 may include a hard drive 820 to store software and data to enable the computer system 800 to provide several features in accordance with the present invention. The secondary storage 806 also may include a disk drive 822 to receive a removable storage device 824 (e.g., a machine-readable medium with machine-readable instructions stored thereon such as a floppy disk, compact disk read only memory (CD-ROM), digital video disk (DVD), or the like), which also may store software and data to enable the computer system 800 to provide several features in accordance with the present invention.

The graphics interface 808 performs its conventional functions of receiving commands and data from the processor 802 and generating display signals (e.g., in RGB format) according to the commands and data received from the processor 802 or other computer system 800 components. Graphics interfaces are well known.

The display unit 810 performs its conventional functions of receiving display signals and displaying video, animation, text, and images defined by the display signals. Display units are well known.

The network interface 812 performs its conventional functions of permitting multiple computer systems such as the computer system 800 to communicate with each other. Network interfaces are well known.

The input interface 814 performs its conventional functions of enabling a user to provide inputs to the computer system 800 via input devices. Example input devices include but are not limited to a keyboard, a scanner, a digital camera, and/or a mouse. Input interfaces are well known.

The database 816 performs its conventional functions of storing data such as text and graphics. In one embodiment, the database 816 stores data input from a keyboard, scanner, digital camera, and/or mouse. The printer 830 performs is conventional functions of printing text and graphics.

The web browser 820 may be any suitable web browser, such as a Netscape® web browser or a Microsoft® Internet Explorer web browser.

Embodiments of the invention can be implemented using hardware, software, or a combination of hardware and software. Such implementations include state machines and application specific integrated circuits (ASICs). In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a first circuitry to select transport packets from a Transport Stream, the selected packets being either (i) the packets being identified with a Program Clock Reference Packet Identifier (PCR PID) and including a Program Clock Reference (PCR) sample in an adaptation field, or (ii) the packets being identified with audio Packet Identifiers (PID); and
    a second circuitry to deliver the selected transport packets to an audio processor across at least one of a bandwidth-limited link and a Bluetooth link.

2. The apparatus of claim 1 wherein the first circuitry is further to select from the Transport Stream packets identified with a Program Association Table Packet Identifier (PAT PID).

3. The apparatus of claim 2 wherein the first circuitry is further to select from the Transport Stream packets identified with a Program Map Table Packet Identifier (PMT PID) corresponding to a selected MPEG-2 program.

4. The apparatus of claim 1, further comprising a third circuitry to deliver video transport packets to a video processor.

5. A method performed by an audio/video apparatus, comprising:
    selecting transport packets from a Transport Stream, the selected transport packets being the transport packets that include a Program Clock Reference (PCR) and audio transport packets; and
    delivering the selected transport packets to an audio processor across at least one of a bandwidth-limited link and a Bluetooth link.

6. The method of claim 5, further comprising selecting from the Transport Stream packets identified with a Program Association Table Packet Identifier (PAT PID).

7. The method of claim 6, further comprising selecting from the Transport Stream packets identified with a Program Map Table Packet Identifier (PMT PID) corresponding to a selected MPEG-2 program.

8. A method, comprising:
    selecting from a full Transport Stream packets having an Adaptation Field and a Program Clock Reference (PCR) sample;
    selecting audio packets from the full Transport Stream; and
    delivering the selected packets across at least one of a bandwidth-limited link and a Bluetooth link, the selected packets being (i) the packets having an Adaptation Field and a PCR sample and (ii) the audio packets.

9. The method of claim 8 wherein selecting packets having an Adaptation Field and a Program Clock Reference (PCR) comprises selecting one or more packets identified with a Program Association Table Packet Identifier (PAT PID).

10. The method of claim 9 wherein selecting packets having an Adaptation Field and a Program Clock Reference (PCR) further comprises selecting one or more packets from the full Transport Stream identified with a Program Map Table Packet Identifier (PMT PID) corresponding to a selected MPEG-2 program.

11. The method of claim 10 wherein selecting from the full Transport Stream packets having an Adaptation Field and a Program Clock Reference (PCR) further comprises selecting from the full Transport Stream one or more packets identified with audio Packet Identifiers.

12. The method of claim 8, further comprising delivering the packets having the Adaptation Field and the Program Clock Reference (PCR) and the audio packets to an audio processor across at least one of a bandwidth-limited link or a Bluetooth link.

13. The method of claim 8, further comprising delivering the full Transport Stream to a video processor across a high-speed serial bus.

14. An apparatus, comprising:
    an audio/video processor to generate a first partial Transport Stream and a second partial Transport Stream from a Transport Stream, wherein the first partial Transport Stream includes a set of video packets having an Adaptation Field and a Program Clock Reference (PCR) sample, and the second partial Transport Stream includes a set of audio packets and a set of transport packets having an Adaptation Field and a Program Clock Reference (PCR) sample, wherein the second partial Transport Stream is coupled to an audio processor in the audio/video processor across a Bluetooth link.

15. The apparatus of claim 14, further comprising a video subsystem coupled to the audio/video processor to receive the first partial Transport Stream across a high-speed serial interface.

16. The apparatus of claim 15, further comprising an audio subsystem coupled to the audio/video processor to receive the second partial Transport Stream across a bandwidth-limited interface.

17. A computer-readable medium, comprising:
computer-readable instructions stored thereon to instruct a processor to select from a full Transport Stream packets that include a Program Clock Reference (PCR) sample and audio transport packets; and
computer-readable instructions stored thereon to instruct a processor to deliver the selected transport packets to an audio processor across at least one of a bandwidth-limited link and a Bluetooth link.

18. The computer-readable medium of claim 17, wherein the computer-readable instructions to instruct the processor to select from the full Transport Stream packets that include a Program Clock Reference (PCR) sample and audio transport packets are further to instruct the processor to select from the full Transport Stream one or more packets identified with a Program Association Table Packet Identifier (PAT PID).

19. The computer-readable medium of claim 18, wherein the computer-readable instructions to instruct the processor to select from the full Transport Stream packets that include a Program Clock Reference (PCR) sample and audio transport packets are further to instruct the processor to select one or more packets identified with a Program Association Table Packet Identifier (PAT PID) and one or more packets identified with a Program Map Table Packet Identifier (PMT PID) corresponding to a selected MPEG-2 program.

20. The computer-readable medium of claim 19, wherein the computer-readable instructions to instruct the processor to select from a full Transport Stream packets that include a Program Clock Reference (PCR) sample and audio transport packets are further to instruct the processor to select one or more packets identified with an audio PID.

21. A computer-readable medium, comprising:
computer-readable instructions stored thereon to instruct a processor to select from a full Transport Stream packets having an Adaptation Field and a Program Clock Reference (PCR) sample;
computer-readable instructions stored thereon to instruct a processor to select audio packets from the full Transport Stream; and
computer-readable instructions stored thereon to instruct a processor to deliver the selected packets having an Adaptation Field and a Program Clock Reference (PCR) sample to an audio processor across at least one of a bandwidth-limited link or a Bluetooth link.

22. The computer-readable medium of claim 21, wherein the computer-readable instructions stored thereon to instruct a processor to select packets having an Adaptation Field and a Program Clock Reference (PCR) sample are further to select one or more packets identified with a Program Association Table Packet Identifier (PAT PID).

23. The computer-readable medium of claim 22, wherein the computer-readable instructions stored thereon to instruct a processor to select packets having an Adaptation Field and a Program Clock Reference (PCR) sample are further to select one or more packets identified with a Program Association Table Packet Identifier (PAT PID) are further to select one or more packets identified with a Program Map Table Packet Identifier (PMT PID) corresponding to a selected MPEG-2 program.

24. The computer-readable medium of claim 23, wherein the computer-readable instructions stored thereon to instruct a processor to select packets having an Adaptation Field and a Program Clock Reference (PCR) sample are further to select one or more packets identified with audio Packet Identifiers.

25. The computer-readable medium of claim 21, further comprising computer-readable instructions stored thereon to instruct a processor to deliver the full Transport Stream to a video processor across a high-speed serial bus.

* * * * *